B. T. Babbitt.
Coffee-Roaster.
Nº 75829. Patented Mar. 24, 1868
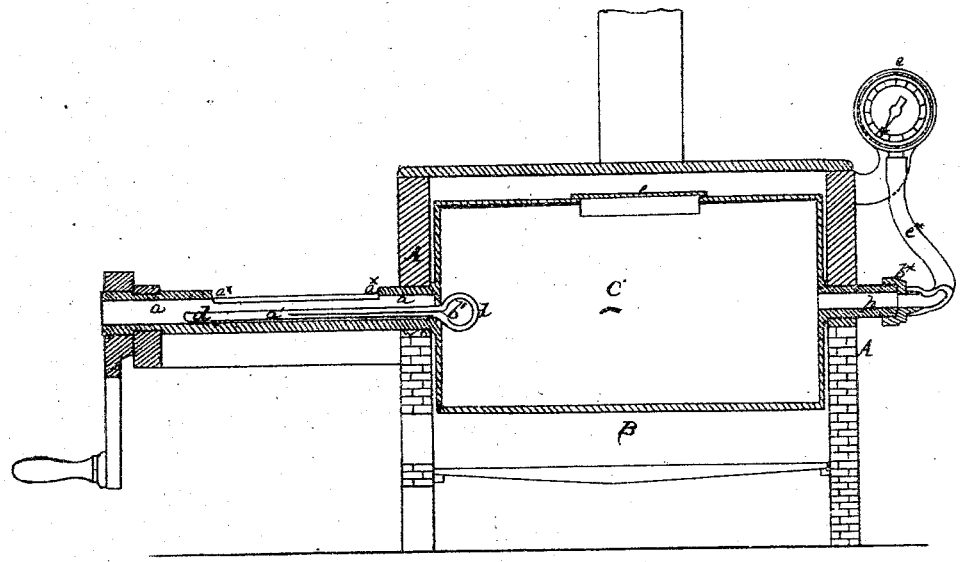
Witnesses
J. W. Coombs
A. Heller
Inventor
B. T. Babbitt
per Brown Coombs
Atty

United States Patent Office.

B. T. BABBITT, OF NEW YORK, N. Y.

Letters Patent No. 75,829, dated March 24, 1868.

---

IMPROVEMENT IN COFFEE-ROASTERS.

---

The Schedule referred to in these Letters Patent and making part of the same.

---

TO ALL WHOM IT MAY CONCERN:

Be it known that I. B. T. BABBITT, of the city, county, and State of New York, have invented certain new and useful Improvements in Preparing Coffee; and I do hereby declare that the following is a full, clear, and exact description of the same, reference being had to the accompanying drawing, making a portion of this specification, which is a vertical longitudinal section of an apparatus constructed according to my invention.

The object of this invention is to prevent the loss of the aroma in volatile products evolved from coffee during the operation of roasting the same; and to this end it consists in the arrangement of a thermometer within the hollow journal of a close and tight vessel, in such manner that the temperature within the vessel during the roasting operation may be readily ascertained, and the requisite heat applied, after which it may be allowed to cool in the same vessel without allowing the aroma to escape, thereby effectually securing the desired effect.

To enable others to understand the construction of my invention, I will proceed to describe it with reference to the drawings.

A represents the surrounding frame or casing of a furnace, B, of any appropriate construction, the said casing being furnished with suitable bearings for the reception of the tubular journals, $a\ b$, of a vessel or coffee-receptacle, C, made preferably of cylindrical shape, and formed with an opening in one side, through which the coffee is passed into the said cylinder or vessel, and which is closed by a lid or cover, $c$, tightly secured thereon when the apparatus is in use. The bearings of the journals just mentioned should be so constructed as to permit the ready removal of the vessel or cylinder from the furnace when desired, as hereinafter fully set forth. The tubular journal, $a$, is elongated, as shown in the drawing, and may be provided with a crank, pulley, or other device, whereby a rotary motion may be communicated to the cylinder or vessel C, and is furthermore formed with a longitudinal opening, $a^*$, in one side, through which may be viewed the stem or tube $a'$ of a thermometer, $d$, the stem, $b'$, of which is situated within the cylinder, the inner end of the journal $a$ being closed around the inner end of the aforesaid stem, in such manner as to prevent the escape of vapor or air between the thermometer and the aforesaid tubular journal, $a$. The other tubular journal, $b$, has its outer end joined to and turning within a coupling, $b^*$, to which is attached a tube, $c^*$, connected with a pressure-gauge, $e$, of any suitable kind.

Any proper or desired quantity of coffee being placed within the cylinder or vessel C, and a suitable fire being provided in the furnace B, a rotary motion, as hereinbefore described, is given to the cylinder until such time as the coffee is roasted to the required degree, the temperature within the cylinder during such roasting operation being, as a general rule, about 350° Fahrenheit, and the pressure about forty pounds to the square inch.

Inasmuch as all escape of vapors or matter volatilized from the coffee by the heat is prevented by the fact that the cylinder is practically air-tight, it follows that any loss in the aroma of the coffee during such roasting operation, is effectually prevented, the condensation of such volatile matters, when the cylinder is cooled by removal from the furnace when the roasting is completed, enabling them to be re-absorbed by the coffee.

Inasmuch as the thermometer exposed to view by the opening $a^*$ in the journal $a$, indicates the temperature within the cylinder, and the pressure-gauge $e$ shows the pressure of the heated or rarefied air and vapor in the same, it follows that the attendant, by the exercise of a slight degree of discretion, is enabled to regulate the fire in the furnace to prevent any burning and consequent destruction of the coffee while the same is being roasted.

What I claim as my invention, and desire to secure by Letters Patent, is—

The thermometer, arranged in the tubular journal of the rotating air-tight vessel or cylinder, substantially as and for the purpose specified.

B. T. BABBITT.

Witnesses:
   J. W. COOMBS,
   A. LE CLERC.